J. HEILBRONN.
Combined Faucets and Air-Vents.
No. 148,823. Patented March 24, 1874.
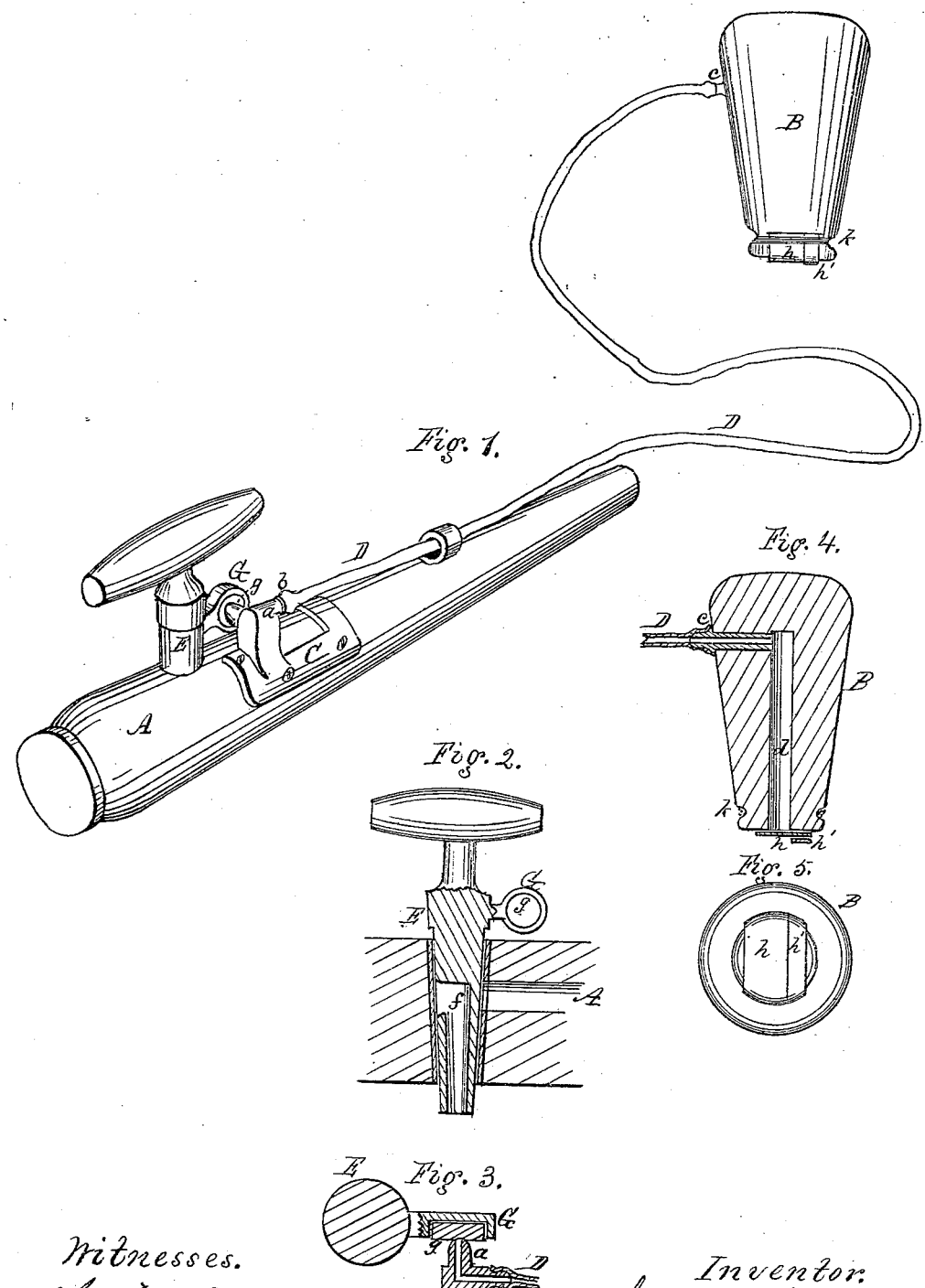
Witnesses.
Archie Baine
H. M. Thomas
Inventor:
Jacob Heilbronn,
pr R. F. Osgood,
atty.

UNITED STATES PATENT OFFICE.

JACOB HEILBRONN, OF ROCHESTER, NEW YORK.

IMPROVEMENT IN COMBINED FAUCETS AND AIR-VENTS.

Specification forming part of Letters Patent No. 148,823, dated March 24, 1874; application filed July 11, 1872.

*To all whom it may concern:*

Be it known that I, JACOB HEILBRONN, of the city of Rochester, in the county of Monroe and State of New York, have invented a certain Improvement in Combined Faucets and Air-Vents for Ale, Beer, Wines, &c., of which the following is a specification:

This invention relates to certain improvements in devices for supplying air to barrels, casks, &c., while the liquid is being drawn from the same; and consists of an arrangement of parts, the construction and operation of which will be fully hereinafter described.

In the drawings, Figure 1 is a perspective view of the faucet, air-tube, and bung; Fig. 2, a vertical section of the faucet; Fig. 3, a horizontal section of the spigot and nipple; Figs. 4 and 5, a vertical section and bottom view, respectively, of the bung.

A represents the faucet, and B the bung. In general form these parts are the same as those in common use. G is a bearing which is screwed or otherwise attached to the outside of the faucet. This bearing has a nipple, $a$, with a passage through it connecting with the stave $b$, to which is attached the air-tube D, preferably made of rubber or other flexible tube. This tube is made of sufficient length to extend over the barrel, where it is attached in a similar manner with the end of a nozzle, $c$, which passes into the side of the bung. A passage is also made through this nozzle, which connects with the main passage $d$ of the bung that opens into the barrel. The spigot E is of ordinary form, being made of brass, composition, or any other desired material. It has the usual discharge-port $f$, for the discharge of the liquid from the spigot. On one side it also has a wing or bearing, G, into which is set a rubber or other packing, $g$, which comes in line with the nipple $a$. These parts are so relatively arranged that when the cock is turned to allow the flow of liquid, the wing G is turned away from the nipple $a$, thereby allowing the air to pass freely through the air-pipe and down the bung into the barrel; but when the spigot is turned to shut off the flow of liquid, then the wing is turned so as to shut the packing $g$ against the nipple, thus closing the passage of air. The bottom of the bung is covered by a diaphragm, $h$, of thin rubber, which is tied or wired on in the groove $k$, or otherwise attached. It is so adjusted that when the pressure of air comes from above, it yields and allows the air to pass into the barrel. I prefer to apply an extra thickness, $h'$, on one side, so that the air shall depress and pass out on the other side only; but, if desired, it may be made to pass on both sides. When the air is shut off, the upward pressure of the gas in the barrel will close the rubber against the end of the bung and stop all egress.

Instead of this device, the rubber diaphragm may be in the form of a small disk, and may be attached on the inner end of the nozzle $c$ before the latter is inserted in the bung, and in that case will lie at the junction of the passage through the nozzle and the main passage $d$ of the bung; and, instead of either of these forms, a small cap may be screwed into the lower end of the bung, having a small passage covered by a valve.

This faucet is of value in drawing ale, beer, wine, and for all uses where a faucet is required, as it allows the air to enter to supply the drain, and at the same time it prevents the escape of the gases, which give life and vitality to the liquid. The faucet passes through an ice-box in the usual manner.

What I claim, and desire to secure by Letters Patent, is—

In combination with the spigot E and tube D, the wing G, with a packing, $g$, and nipple $a$, arranged and operating as herein described.

In witness whereof I have hereunto signed my name in the presence of two subscribing witnesses.

JACOB HEILBRONN.

Witnesses:
ARCHIE BAINE,
R. F. OSGOOD.